United States Patent [19]

Boiucaner et al.

[11] Patent Number: 4,952,080
[45] Date of Patent: Aug. 28, 1990

[54] AUTOMATIC ASSIST FOR SWING-DOOR OPERATOR

[75] Inventors: Leon Boiucaner, Farmington; James J. Scott, New Britain, both of Conn.

[73] Assignee: The Stanley Works, New Britain, Conn.

[21] Appl. No.: 351,093

[22] Filed: May 12, 1989

[51] Int. Cl.⁵ ............................................. G05B 19/28
[52] U.S. Cl. .................................... 388/811; 388/921; 318/602; 318/640; 49/138
[58] Field of Search ................................ 318/282-293, 318/269, 602-603, 640, 650, 671, 599; 388/811, 819, 829, 900, 910, 921, 810, 812, 814, 815; 49/138

[56] References Cited

U.S. PATENT DOCUMENTS

| | | | |
|---|---|---|---|
| 4,152,758 | 4/1979 | Bailey et al. | 388/819 X |
| 4,153,863 | 4/1979 | Schachte et al. | 388/811 X |
| 4,263,536 | 4/1981 | Lee et al. | 318/468 X |
| 4,369,399 | 1/1983 | Lee et al. | 318/467 |
| 4,467,249 | 8/1984 | Swearingen | 318/16 X |
| 4,516,060 | 4/1985 | Guzik et al. | 388/811 |
| 4,563,625 | 1/1986 | Kornbrekke et al. | 318/603 |
| 4,567,411 | 1/1986 | Reimann et al. | 388/811 |
| 4,667,480 | 4/1987 | Bessler | 388/811 X |
| 4,727,679 | 3/1988 | Kornbrekke et al. | 49/138 |

Primary Examiner—William M. Shoop, Jr.
Assistant Examiner—David Martin
Attorney, Agent, or Firm—Chilton, Alix & Van Kirk

[57] ABSTRACT

A manual power assist control employs a magnetic encoder which is mounted to a shaft of the door operator. The encoder generates pulse trains which are indicative of an attempt to open the door in a given direction. The pulses are processed to generate a signal for opening the doors in the event a manual attempt to open the doors is detected.

20 Claims, 3 Drawing Sheets

AUTOMATIC ASSIST FOR SWING-DOOR OPERATOR

BACKGROUND OF THE INVENTION

This invention relates generally to automatic door operators. More particularly, this invention relates to devices for triggering the operation of automatic swing-door operators.

Numerous devices and techniques have been advanced for triggering opening and closing sequences for automatic door operators which control the operation of doors. Actuating carpets which initiate a door opening sequence by an electrical contact closure are commonly employed to provide a mechanical actuating event. Microwave radiation, infrared radiation and ultrasound have also been employed to sense motion or presence of a subject for triggering the door operation.

U.S. Pat. No. 4,727,679 entitled "Swing-Door Operator System" discloses an automatic swing-door system of type to which the present invention may be employed. A motor is driven at various speeds for opening and closing, a swing-door via a linkage assembly. An electronic control unit controls the operation of the motor.

SUMMARY OF THE INVENTION

Briefly stated, the invention in a preferred form is a manually activatable, automatic assist which is employed in conjunction with an automatic door operator such as a swing-door operator. The automatic assist detects an attempt to manually open the door and employs the detection signal to trigger the opening sequence of the door. The manually activatable control functions to sense door movement resulting from a force applied to the door in the opening direction. The opening force is sensed when the door is in a closed position or in any other transient state of the closing sequence.

An encoder is rotatably coupled to one of the shafts of the automatic door operator. The encoder generates a train of pulses in response to rotary motion of the shaft. A direction switch is employed for selecting the pulse train of a pre-determined rotatable direction. A pulse shaper circuit translates the directional pulse train into a wave form having pulses of a pre-established width. An integrator circuit generates a DC signal having a wave form which is a function of the widths and repetition rate of the pulse shaper wave form. A reference signal is established in response to the number of pulses received for a pre-established time interval. A comparator compares the DC signal to the reference signal and a power assist logic signal is generated in the event that the DC wave form voltage exceeds the reference signal voltage. A timer circuit is responsive to the power assist signal for generating a hold open output for a pre-established time duration.

The encoder may be a rotor having a plurality of magnetic poles. A pair of Hall effect sensors are positioned so as to generate two trains of pulses in quadrature. A potentiometer may be employed for implementing a sensitivity adjustment for adjusting the pulse width of the wave form pulses. A hysteresis feedback signal is generated to the comparator for changing the reference signal. The hold open signal is applied to an output relay.

An auxiliary circuit which may be employed for a handicapped access in the form of a manual push plate switch generates a second hold open signal. The second hold open signal is applied to the output relay via an adjustable timer. The auxiliary circuit provides an independent input to the control.

An object of the invention is to provide a new and improved manually activatable, automatic power assist for an automatic door system.

Another object of the invention is to provide a new and improved manually activatable control which reliably detects an attempt to open a door and translates the attempt into an automatic power assisted door opening sequence.

A further object of the invention is to provide a new and improved manually activatable control for automatically triggering an automatic door operator without requiring a conventional motion or presence sensor or actuation of a contact switch.

Other objects and advantages of the invention will become apparent from the drawings and the specification.

DETAILED DESCRIPTION OF THE INVENTION

Figure 1:
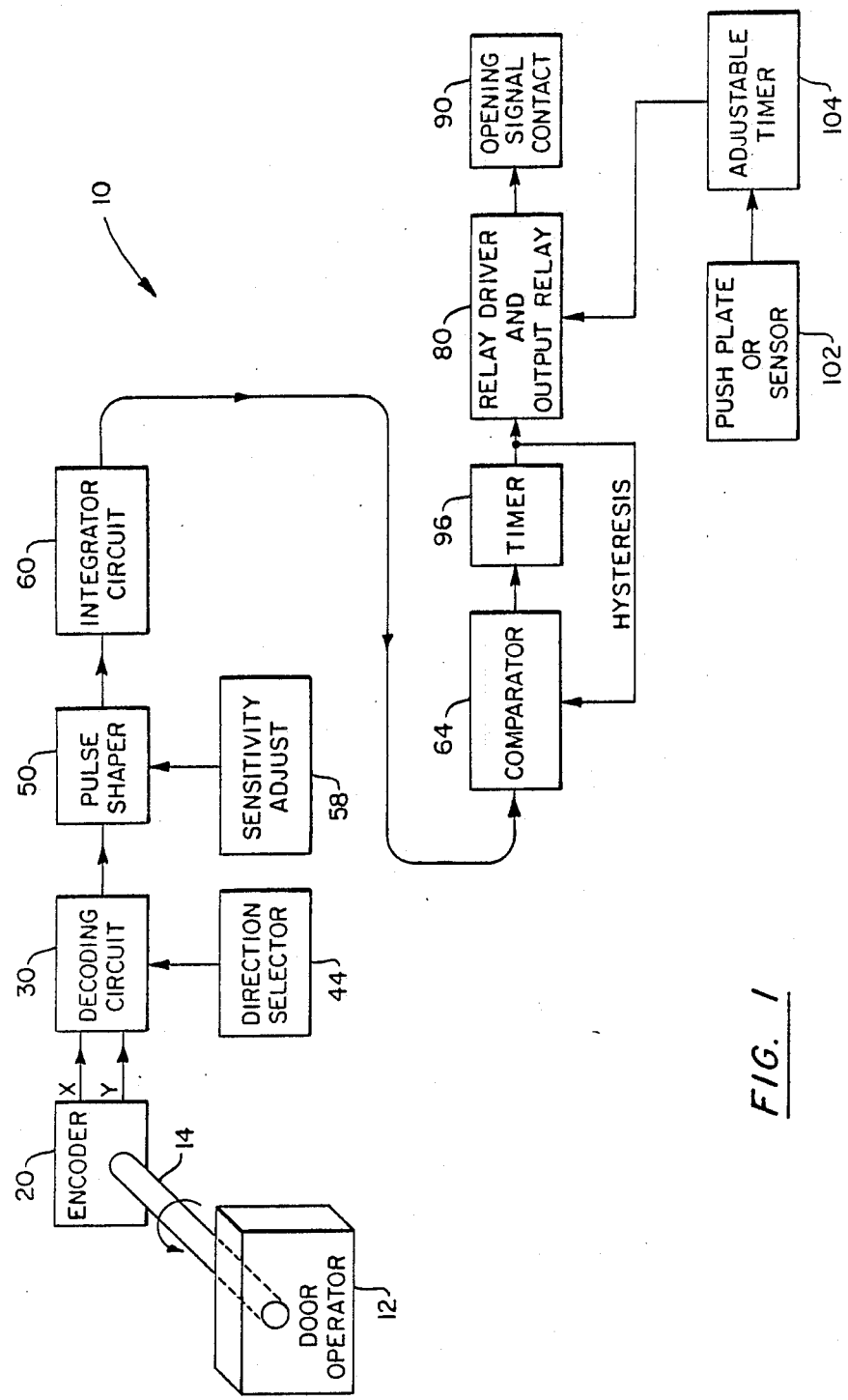
FIG. 1 is a schematic block diagram of the manually activatable power assist control of the present invention.
Figure 2:
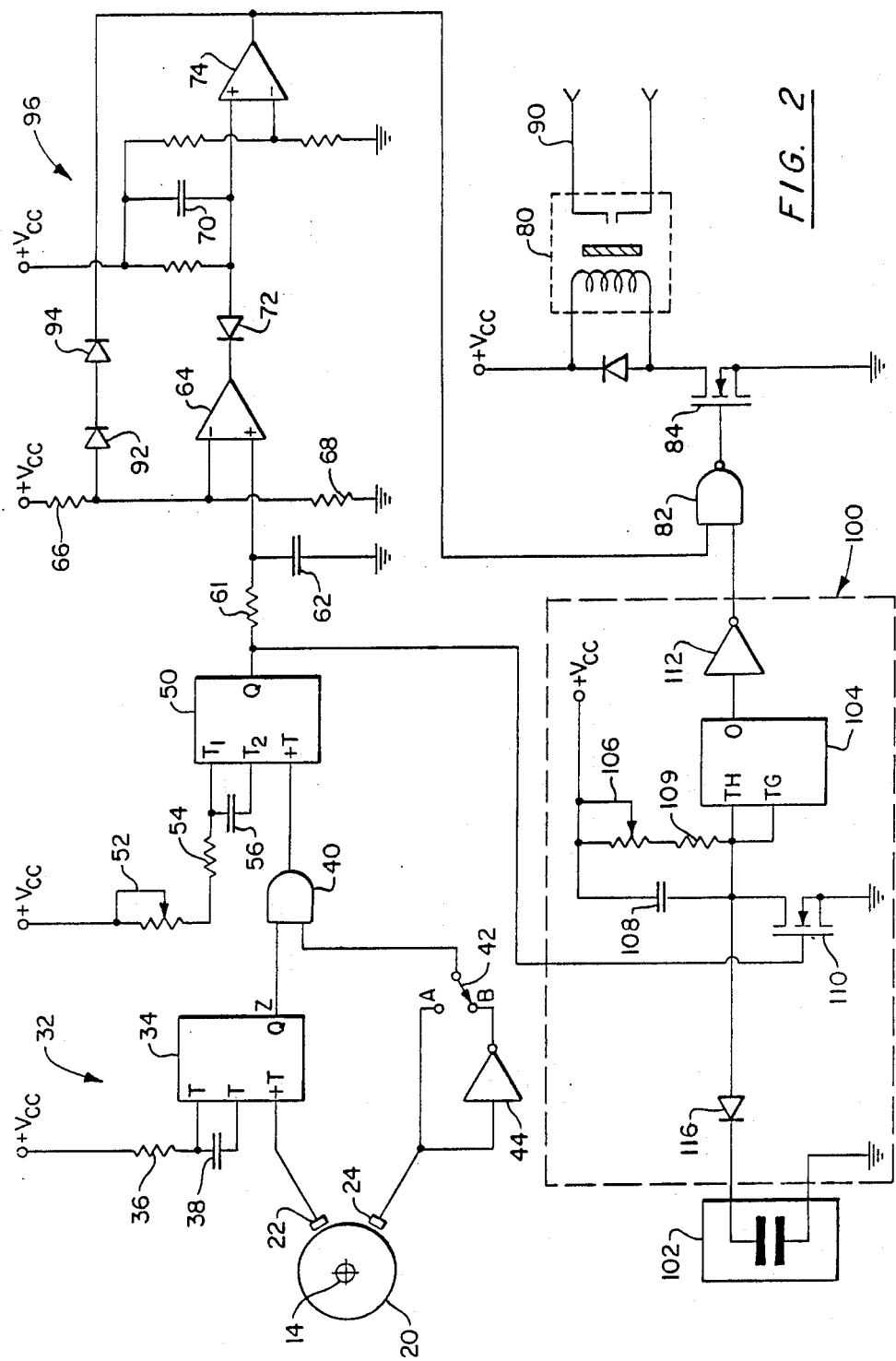
FIG. 2 is a simplified schematic circuit diagram of the manually activatable control of FIG. 1.

With reference to the drawings, wherein like numerals represent like parts throughout the figures, a manually activatable, power assist control in accordance with the present invention is generally designated by the numeral 10. The power assist control 10 is employed in conjunction with an automatic door operator designated generally by the numeral 12. Door operator 12 may be adapted for opening and closing a swing door. Door operator 12 includes one or more shafts 14 in the power train which mechanically connects with the door. Shaft 14 may be either an operator drive shaft, motor shaft or a secondary shaft. The control functions by sensing door movement (manually applied opening force) in the opening direction such as may result from an attempt to manually push open the door. The door movement can be sensed at any time during which the door is in the closed position or a transient closing state.

Figure 4:
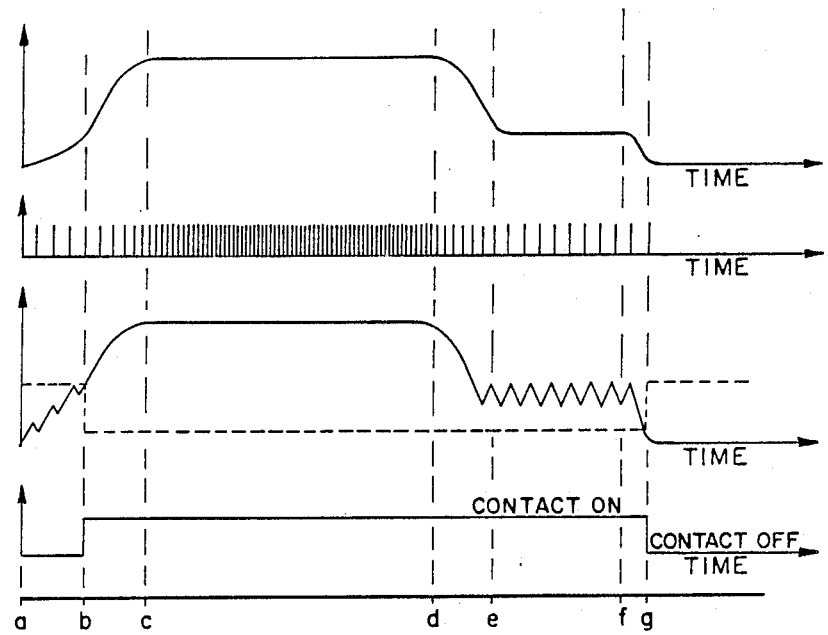
FIG. 4 a graph illustrating various signal relationships for the manually activatable control of FIG. 1.

With reference to graph A of FIG. 4, the control is adapted to parallel the conventional door opening and closing sequence wherein the door commences opening at time a. The door speed gradually increases to time c when the maximum (full) opening speed is attained. The full opening speed is maintained until time d. The door speed decreases to a low check speed between times d and e. The low check speed is generally maintained until time f when the door motion stops at the fully open position.

The power assist control 10 may also incorporate suitable circuitry so that the door opening sequence may also be independently triggered for a handicapped or a manually operated safety opening mode. The timing of the control 10 is automatically adjusted to the door opening time so that the fully open door state is achievable regardless of the door opening speed setting or the specific door angle at which an opening force is applied. The power assist control also has a sensitivity adjustment setting a threshold for unwanted (nuisance) trips to account for door movement that is very slow, such as, for example, may be a result of stack pressure. The sensitivity adjustment also accounts for an applied force of very short time duration, such as, for example a resultant slight bounce when a fully closed position is attained.

A rotary encoder 20 is mounted or otherwise rotatably coupled to the secondary shaft 14 of the door operator 12. The encoder 20 may essentially be a magnetic rotor sensed by two appropriately positioned Hall effect sensors. Alternately, the encoder 20 may be mounted to the operator motor, the drive shaft or another output shaft of the operator. For a door operator such as disclosed in U.S. Pat. No. 4,727,679 entitled "Swing-Door Operator System" and assigned to the assignee of the present invention, the encoder 20 is preferably mounted to a secondary shaft. The encoder is preferably a magnetic encoder which has a multiplicity of angularly spaced magnetic poles. Twenty-four magnetic poles are provided in one embodiment. Two Hall effect sensors 22 and 24 are positioned adjacent to the magnetic encoder rotor 20 at angles which will ensure two outputs in quadrature, e.g., 90 degrees phase shift. For the illustrated encoder which employs a twenty-four pole rotor, the Hall effect sensors are positioned at an angle of 67.5 degrees.

The output (X, Y) from the two channel quadrature encoder 20 is applied to a decoding circuit 30. The decoding circuit comprises a monostable pulse shaper circuit 32 which generates a short pulse of constant width for each positive transition at the output of the Hall effect sensor 22. The monostable pulse shaper circuit 32 comprises a timer 34, a resistor 36 and a capacitor 38 for setting the timing.

The pulse train Z from the pulse shaper circuit 32 is applied to an AND gate 40 which transmits the pulse only when the second input to the AND gate is at a high level. The output from Hall effect sensor 24 is applied through a direction selector switch 42 to AND gate 40. An inverter 44 is interposed in the selector circuit. The selector switch 42 allows for the selection of either a clockwise or a counter clockwise direction so that the control 10 may be employed for either a left or right hand door.

Figure 3:
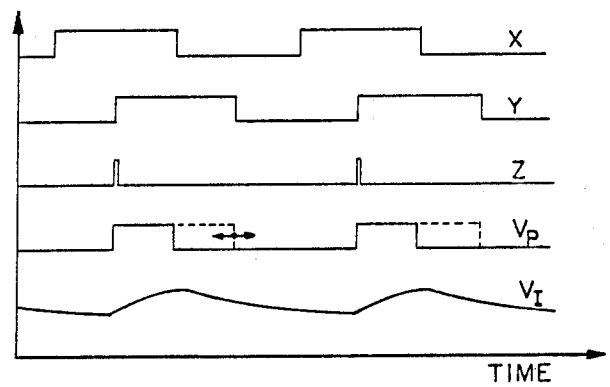
FIG. 3 is a graph illustrating various wave forms and phase relationships of signals employed in the manually activatable control of FIG. 1.

A second monostable pulse shaper circuit 50 shapes the decoder pulses to a pre-established pulse width. The pulse shaper circuit 50 operates with a timing resistance/capacitance network comprising a potentiometer 52, resistor 54 and capacitor 56 to implement a sensitivity adjustment by varying the pulse width generated by the pulse shaper monostable 50. The output from pulse shaper 50 has the general wave form $V_P$ of FIG. 3. An integrator 60 comprising resistor 61 and capacitor 62 converts the pulses at the output of the monostable pulse shaper circuit 50 to a DC voltage $V_I$. It will be appreciated that the output level for a given pulse rate is a function of the pulse width which is selected by the sensitivity adjuster 58. The adjustment schematically illustrated in FIG. 3 is implemented by potentiometer 52.

The integrated DC voltage $V_I$ is applied to a comparator 64. Resistors 66 and 68 establish the reference level for the comparator. When the integrated DC output exceeds the comparator reference level, the comparator 64 is actuated. The actuation of the comparator 64 discharges a timing capacitor 70 via a separation diode 72 and changes the state of a comparator 74 to a low output. An output relay 80 is thus energized via a NAND gate 82 and a driver transistor 84. The output relay 80 generates an operate door open signal at the output terminal 90. The terminals 90 are connected to the operate input of the door operator to provide a power assist (opening) signal to the door operator.

Diodes 92 and 94 generate a strong hysteresis signal to the reference input of the comparator 64 by decreasing the voltage level at the junction of the resistors 66 and 68 to two diode voltage drops which may, for example, be approximately 1.4 volts. As soon as any movement is detected by the accumulation of a pre-established number of pulses by the integrator circuit 60, the decreasing of the voltage level assures the maintenance of an operate signal at the terminals 90 for as long as the door is moving (in the direction pre-selected by the selector switch 42). The operate signal is maintained even if the door velocity varies widely, such as may, for example, occur when the door slows down in the check zone before reaching the final fully open position of the doors.

The resettable timer circuit 96 integrated with the comparator 74 functions to maintain a continuous operate signal even for very low door velocities. At the very low velocities, the pulse rate from the encoder 20 is sufficiently low that the integrator circuit can no longer provide a well filtered DC signal to the comparator 64. The signal is ordinarily heavily rippled (such as illustrated in graph C of FIG. 4) for the check speed zones. Consequently, the comparator 64 will generate a discontinuous quasi-pulsed signal. Each high-to-low transition at the output of the comparator resets the timing network comprising resistor 60 and capacitor 62. Only when the encoder pulse rate goes to below a certain level, which indicates effectively a stopped door, will the comparator 74 change state cancelling the output operate signal.

The output relay 80 may also be enabled from an auxiliary circuit designated generally by the numeral 100. The auxiliary circuit 100 independently functions to provide a security or a handicapped opening trigger. A push plate 102 provides an input through a 555-type timer 104. The timer is adjusted by means of the timing network comprising the adjustable hold open potentiometer 106, capacitor 108, resistor 46, and separation diode 116. Once the auxiliary operate signal is generated at push plate 102, a transistor 110 will periodically reset the timer 104 for as long as the door movement generates pulses at the monostable pulse shaper circuit 50 which controls the transistor. Thus, an adjustable hold open delay signal starts at the moment the door reaches the fully open position. An inverter 182 is interposed between the timer and the NAND gate 82 for combining the hold open signals.

With reference to graph C of FIG. 4, the output of the integrator 60 is illustrated as a solid line in the voltage versus time graph. During the operation, the initial trigger level of the comparator is set at a relatively high level. As soon as the input exceeds the threshold reference level (broken line) at time b, the comparator output will enable the resettable timer 96. The resettable timer, in turn, transmits to the comparator 64 a hysteresis signal which results in a substantial diminishing of the comparator threshold level. Thus, the output relay is kept actuated even in the slow check zone. When the door is close to a fully open position, then the velocity drops below the trigger velocity that initiated the door opening process. The time delay for the output relay 80 is selected so that for a minimum speed detected in the slowdown zone between time e to time f, the pulses B coming from the encoder 20 will reset the timer 96 before it times out and a continuous output signal is attained.

As soon as the door stops in a fully open position, the stream of encoder pulses ceases. The timer is allowed to time out to release the output relay 80 at time g to thereby remove the opening signal present while the door is opening. The relay 80 contact signal wave form is illustrated as graph D in FIG. 4. It will be appreciated that the control 10 provides an automatically timed opening signal which is always matched to the operator transit time toward a fully open state.

It will be appreciated that the manually activatable power assist control 10 may be employed in place of separate door sensors so that the automatic door will open upon an attempt to manually open the door. The power assist control 10 is sufficiently sophisticated so that it will not improperly trigger due to spurious slow door movements resulting from stack pressure or from the slight door bouncing which may occur when the door is returned to the fully closed position. In addition, the automatic opening sequence can be initiated at any point during the door closing sequence by an attempt to reopen the door manually. The timing of the operating signal will automatically adjust to the actual door opening sequence as implemented by the various door operator settings. Stopping the door manually while the door is in an opening transit state will result in cancellation of the power assist signal and start of a closing cycle. The control 10 can be adapted for usage with numerous types of automatic operators that can be easily fitted with an incremental encoder.

While a preferred embodiment of the invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed:

1. A manually activatable assist control for an automatic door operator comprising:
    drive means comprising at least one rotatable shaft employable for moving a door;
    encoder means rotatably coupled to a said shaft for generating a train of pulses in response to rotary motion of said shaft;
    direction selector means for selecting a pulse train of a predetermined rotatable direction;
    pulse shaper means for translating said directional pulse train to shape a wave form having pulses of pre-established width;
    integrator means for generating a DC signal having a DC wave form which is a function of the widths of said shaped wave form pulses;
    reference means for establishing a reference signal in response to the number of encoder pulses generated for a pre-established time interval;
    comparator means for comparing said DC signal to said reference signal and generating a power assist signal in the event said DC signal voltage exceeds said reference signal voltage;
    timer means responsive to said power assist signal for generating a hold open output signal for a pre-established time duration;
    output signal means responsive to said hold open output signal for transmitting an opening signal; and
    door control means for automatically controlling the drive means for opening and closing the door, said control means comprising an opening input means for triggering the door to an opening mode, said opening input means being responsive to said opening signal.

2. The manual control of claim 1 wherein said encoder means comprises a rotor having a plurality of magnetic poles.

3. The manual control of claim 1 wherein said encoder means further comprises a pair of Hall effect sensors, said sensors being positioned so as to generate two trains of pulses in quadrature.

4. The manual control of claim 1 further comprising sensitivity adjustment means for adjusting the pulse width of said shaped wave form pulses.

5. The manual control of claim 1 further comprising hysteresis means for generating a hysteresis feedback signal to said comparator for changing said reference signal.

6. The manual control of claim 1 further comprising an output relay means, said hold open signal being applied to said output relay means.

7. The manual control of claim 6 further comprising a switch means generating a second hold open signal, said second signal being applied to said output relay means.

8. The manual control of claim 7 wherein said second signal is further applied to an adjustable timer.

9. A manually activatable power assist control for an automatic door operator comprising:
    drive means comprising at least one rotatable shaft employable for moving a door;
    encoder means rotatably coupled to a said shaft for generating a train of pulses in response to rotary motion of said shaft;
    pulse shaper means for translating said pulse train to a shaped wave form having pulses of pre-established width;
    processor means responsive to said train of pulses for generating an integrated signal;
    reference means for establishing a reference signal in response to the number of encoder pulses generated for a pre-established time interval;
    comparator means for comparing said integrated signal to said reference signal and generating a power assist signal and a hysteresis signal to said reference means in the event said integrated wave form voltage exceeds said reference signal voltage;
    timer means responsive to said power assist signal for generating a hold open output signal for a pre-established time duration;
    output signal means responsive to said hold open output signal for transmitting an opening signal; and
    door control means for automatically controlling the drive means, said door control means comprising an opening input means for triggering the door to an opening mode, said opening input means being responsive to said opening signal so that said drive means is placed in an opening mode in response to application of a pre-established force against the said door.

10. The manual control of claim 9 wherein said encoder means comprises a rotor having a plurality of magnetic poles.

11. The manual control of claim 9 wherein said encoder means further comprises a pair of Hall effect sensors, said sensors being positioned so as to generate two trains of pulses in quadrature.

12. The manual control of claim 9 wherein said output signal means comprises an output relay means and switch means generating a second hold open signal, said second signal being applied to said output relay means.

13. The manual control of claim 12 wherein said second signal is further applied to an adjustable timer.

14. A manually activatable power assisted automatic operator comprising:
   drive means comprising at least one rotatable shaft employable for moving a door;
   encoder means rotatably coupled to a said shaft for generating a train of pulses in response to rotary motion of said shaft;
   direction selector means for selecting a pulse train of a predetermined rotatable direction;
   pulse shaper means for translating said directional pulse train to a shaped wave form having pulses of pre-established width;
   integrator means for generating an integrated signal having an integrated wave form which is a function of the widths of said shaped wave form pulses;
   reference means for establishing a reference signal in response to the number of encoder pulses received for a pre-established time interval;
   comparator means for comparing said integrated wave form to said reference signal and generating a power assist signal in response to said comparison;
   timer means responsive to said power assist signal for generating a hold open output signal for a pre-established time duration;
   output signal means responsive to said hold open output signal for transmitting an opening signal; and
   door control means responsive to said opening signal for triggering said rive means to an opening mode in response to application of a pre-established force against said door.

15. The manual control of claim 14 wherein said encoder means comprises a rotor having a plurality of magnetic poles.

16. The manual control of claim 14 wherein said encoder means further comprises a pair of Hall effect sensors, said sensors being positioned so as to generate two trains of pulses in quadrature.

17. The manual control of claim 14 further comprising sensitivity adjustment means for adjusting the pulse width of said shaped wave form pulses.

18. The manual control of claim 14 further comprising hysteresis means for generating a hysteresis feedback signal to said comparator for changing said reference signal.

19. The manual control of claim 14 further comprising an output relay means, said hold open signal being applied to said output relay means.

20. The manual control of claim 19 further comprising a switch means generating a second hold open signal, said second signal being applied to said output relay means.

* * * * *